US012741601B2

(12) United States Patent
Yuzawa

(10) Patent No.: US 12,741,601 B2
(45) Date of Patent: Sep. 22, 2026

(54) DISPLAY SYSTEM FOR VEHICLE

(71) Applicant: TOYOTA JIDOSHA KABUSHIKI KAISHA, Toyota (JP)

(72) Inventor: Akifumi Yuzawa, Inukami-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 607 days.

(21) Appl. No.: 18/185,034

(22) Filed: Mar. 16, 2023

(65) Prior Publication Data

US 2023/0303019 A1 Sep. 28, 2023

(30) Foreign Application Priority Data

Mar. 23, 2022 (JP) ................................ 2022-046246

(51) Int. Cl.
*B60R 16/03* (2006.01)
*B60R 11/00* (2006.01)

(52) U.S. Cl.
CPC ....... *B60R 16/03* (2013.01); *B60R 2011/0003* (2013.01); *B60R 2011/004* (2013.01); *B60R 2300/20* (2013.01); *B60Y 2200/143* (2013.01)

(58) Field of Classification Search
CPC ............. B60R 16/03; B60R 2011/0003; B60R 2011/004; B60R 2300/20; B60R 16/02; B60Y 2200/143; G09F 9/33; G09F 9/35
See application file for complete search history.

(56) References Cited

U.S. PATENT DOCUMENTS

2002/0156553 A1* 10/2002 Read ...................... G06Q 30/02 701/1
2009/0140845 A1 6/2009 Hioki
2013/0169612 A1* 7/2013 Woo ........................ H02J 9/005 307/66

(Continued)

FOREIGN PATENT DOCUMENTS

JP 2004224132 A * 8/2004
JP 2009-101778 A 5/2009

(Continued)

OTHER PUBLICATIONS

JP2004224132 machine translation (Year: 2004).*

(Continued)

*Primary Examiner* — Anne Marie Antonucci
*Assistant Examiner* — Jingli Wang
(74) *Attorney, Agent, or Firm* — Oliff PLC

(57) ABSTRACT

A display system for vehicle includes: a display located on a vehicle; a display CTL that supplies display data to the display; a display power supply relay that switches on and off feeding of power to the display; a CTL power supply relay that switches on and off feeding of power to the display CTL; an instruction receiver; and a power supply controller that controls the display power supply relay and the CTL power supply relay. The power supply controller turns on the display power supply relay and the CTL power supply relay, thereby placing the display system in a displaying mode. In the displaying mode, upon receiving an OFF instruction from the instruction receiver, the power supply controller turns off the display power supply relay while maintaining the controller power supply relay in the ON state, and thereby places the display system in a sleep mode.

10 Claims, 8 Drawing Sheets

(56) References Cited

U.S. PATENT DOCUMENTS

| | | | | |
|---|---|---|---|---|
| 2020/0132034 | A1* | 4/2020 | Ando | F02N 11/0866 |
| 2023/0150366 | A1* | 5/2023 | Nakajima | B60L 3/0092<br>701/22 |

FOREIGN PATENT DOCUMENTS

| | | | | | |
|---|---|---|---|---|---|
| JP | 2009-137341 | A | | 6/2009 | |
| JP | 2011183916 | A | * | 9/2011 | |
| JP | 2012155061 | A | * | 8/2012 | |
| JP | 2020040420 | A | * | 3/2020 | B60R 99/00 |

OTHER PUBLICATIONS

JP2011183916 machine translation (Year: 2011).*
JP 2012155061 A machine translation (Year: 2012).*
JP2020040420A machine translation (Year: 2020).*

* cited by examiner

DISPLAY POWER SUPPLY 45

DISPLAY SYSTEM FOR VEHICLE

This application claims priority to Japanese Patent Application No. 2022-046246 filed on Mar. 23, 2022, which is incorporated herein by reference in its entirety including the specification, claims, drawings, and abstract.

TECHNICAL FIELD

The present disclosure relates to a display system for vehicle, and more particularly to power supply control of a display and a display controller mounted on a vehicle.

BACKGROUND

Vehicles such as transit buses have LED displays located on the front face, rear face, and/or side face of each vehicle, and the vehicle operation is performed with the route name, destination, stopping stations, and the like displayed on the LED displays. Such vehicles may also have a display (e.g., a liquid crystal display) located inside the vehicle cabin for displaying information such as all stopping stations.

A display system mounted on a vehicle such as a transit bus is configured to include a display and a display controller that supplies display data to the display. Feeding of power to the display system is controlled by a power supply switch provided inside the vehicle and an ignition switch of the vehicle.

JP 2009-101778 A discloses a technique in which when a vehicle is left standing with the ignition power supply in an ON state, feeding of power by that power supply is shut off under certain conditions to thereby prevent battery depletion.

Regarding the vehicle-mounted display system, there are cases where feeding of power to the display system is shut off by a vehicle crew member's manipulation or the like. In those cases, when feeding of power to the display system is restarted by a vehicle crew member's manipulation for displaying images on a display, since an activation process is carried out in the display controller, there is the problem that a considerable amount of time is required until images are displayed on the display.

The present disclosure is directed to causing images to be displayed promptly on a display when a vehicle crew member performs a manipulation for displaying images on the display.

SUMMARY

A display system for vehicle according to an aspect of the present disclosure includes: a display located on an outer face or inside a vehicle cabin of a vehicle; a display controller configured to supply display data to the display; a display power supply relay configured to switch on and off feeding of electric power to the display; a controller power supply relay configured to switch on and off feeding of electric power to the display controller; an instruction receiver configured to receive instructions for turning on and off the display power supply relay; and a power supply controller configured to control the display power supply relay and the controller power supply relay. The power supply controller switches the controller power supply relay from an OFF state to an ON state at a predetermined point of time and also switches the display power supply relay from an OFF state to an ON state at a point of time of receiving an ON instruction from the instruction receiver, thereby placing the display system in a displaying mode in which feeding of power to both of the display controller and the display is carried out. In the displaying mode, upon receiving an OFF instruction from the instruction receiver, the power supply controller switches the display power supply relay from the ON state to the OFF state while maintaining the controller power supply relay in the ON state, and thereby place the display system in a sleep mode in which feeding of power to the display is shut off while feeding of power to the display controller is maintained.

In the display system for vehicle according to an aspect of the present disclosure, when, after detecting switching of an ignition switch of the vehicle from an ON state to an OFF state while in the displaying mode, a predetermined period of time has elapsed from the detection, the power supply controller may switch the display power supply relay from the ON state to the OFF state, and thereby place the display system in the sleep mode.

In the display system for vehicle according to an aspect of the present disclosure, upon receiving an ON instruction from the instruction receiver while in the sleep mode, the power supply controller may switch the display power supply relay from the OFF state to the ON state, and thereby place the display system back in the displaying mode.

The display system for vehicle according to an aspect of the present disclosure may further include a lock detector configured to detect locking of a door effected by a key of the vehicle, and the power supply controller may switch the controller power supply relay from the ON state to the OFF state when locking of the door is detected by the lock detector.

The display system for vehicle according to an aspect of the present disclosure may further include an unlock detector configured to detect unlocking of a door effected by a key of the vehicle, and the power supply controller may switch the controller power supply relay from the OFF state to the ON state when unlocking of the door is detected by the unlock detector.

In the display system for vehicle according to an aspect of the present disclosure, the instruction receiver may be a press button located inside the vehicle cabin of the vehicle. Upon detecting pressing of the press button while the display power supply relay is in the OFF state, the power supply controller may accept this pressing as an instruction to turn on the display power supply relay, and upon detecting pressing of the press button while the display power supply relay is in the ON state, the power supply controller may accept this pressing as an instruction to turn off the display power supply relay.

In the display system for vehicle according to an aspect of the present disclosure, the instruction receiver may be an ignition switch of the vehicle. Upon detecting a change in the ignition switch from an OFF state to an ON state, the power supply controller may accept this change as an instruction to turn on the display power supply relay, and upon detecting a change in the ignition switch from the ON state to the OFF state, the power supply controller may accept this change as an instruction to turn off the display power supply relay.

According to the present disclosure, since feeding of power to the display controller is maintained in the sleep mode of the display system, when, while in the sleep mode, the instruction receiver receives an instruction to turn on the display power supply relay (i.e., an instruction to display images on the display) from a vehicle crew member, images are displayed promptly on the display.

BRIEF DESCRIPTION OF DRAWINGS

Embodiment(s) of the present disclosure will be described based on the following figures, wherein.

DESCRIPTION OF EMBODIMENTS

Embodiments of the present disclosure will now be described by reference to the drawings. The configurations described below are examples provided for the purpose of explanation only, and changes can be made thereto as appropriate in accordance with vehicle specifications and the like. Further, when the following description refers to a plurality of embodiments or variants, it is envisioned from the beginning that characteristic features thereof may be used in combination as appropriate. In all of the drawings, the same elements are assigned the same reference signs, and repeated description will not be given.

Figure 1:
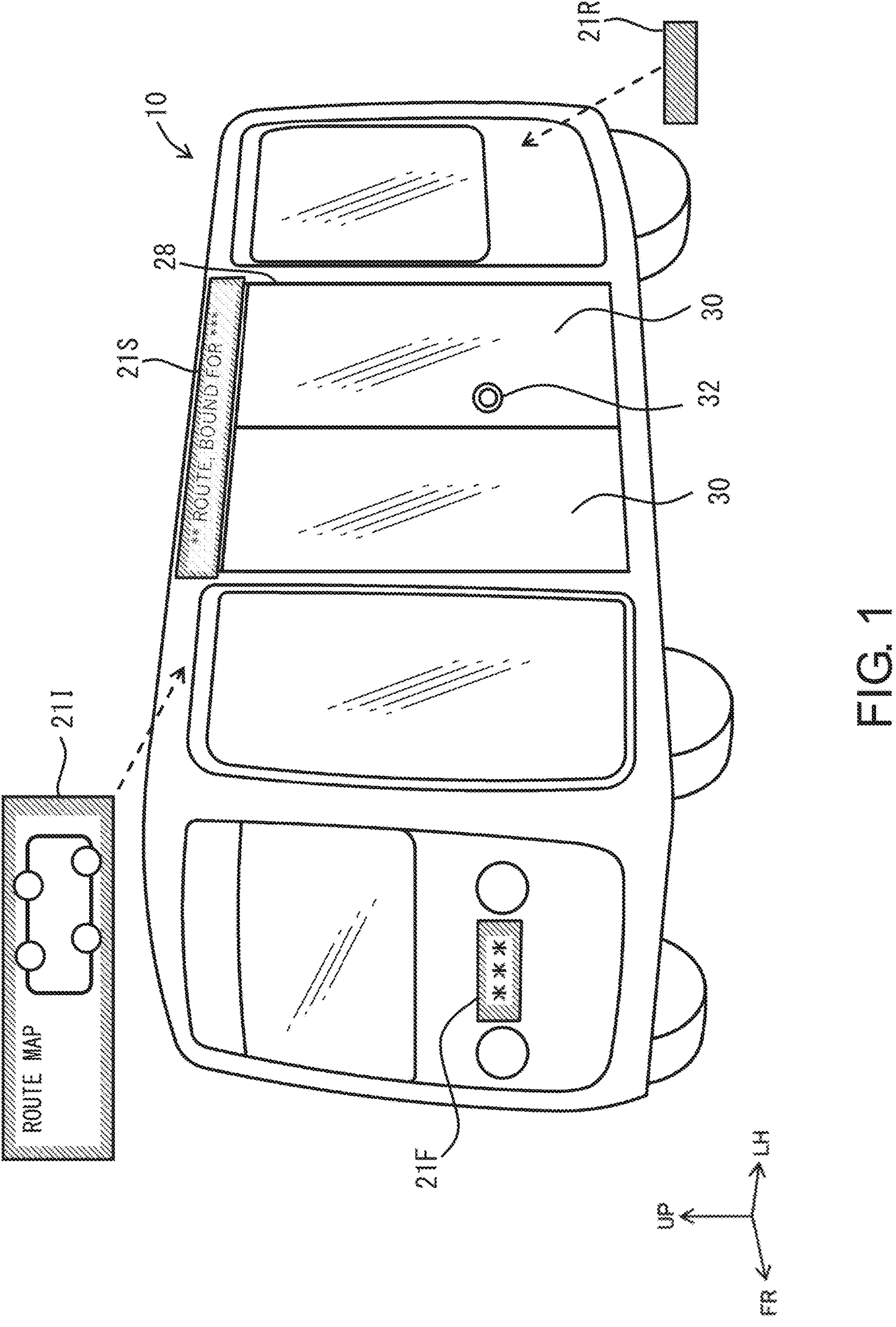
FIG. 1 is a perspective view of a vehicle according to an embodiment.

FIG. 1 is a perspective view of a vehicle 10 according to an embodiment. In FIG. 1, an arrow FR indicates the vehicle front direction, an arrow UP indicates the vehicle upward direction, and an arrow LH indicates the vehicle left direction. In FIG. 1, a display 211 located inside the vehicle cabin and a display 21R located on the vehicle rear face are shown in a pop-up manner, and the actual locations of those displays are indicated by dashed arrows.

The vehicle 10 has an approximate shape of a rectangular solid, and is an automobile capable of performing automated driving. Specifically, the vehicle 10 can be driven in a plurality of driving modes including an automated driving mode and a manual driving mode. The vehicle 10 is an electric vehicle that uses a rotating electric machine (not shown in drawing) as the drive source. In the vehicle 10, a battery for supplying electric power to the rotating electric machine is installed. According to another embodiment, the vehicle 10 may be an automobile that uses a combustion engine as the drive source.

The vehicle 10 is used as a transit bus boarded by a large number of passengers from the general public. A boarding/alighting doorway 28 is provided at a side part of the vehicle body of the vehicle 10. The boarding/alighting doorway 28 is located approximately at the center in the vehicle longitudinal direction, and is closed by doors 30 during travel of the vehicle. The doors 30 are sliding doors, and the boarding/alighting doorway 28 is configured to be opened when the front door 30 moves frontward and the rear door 30 moves rearward.

The vehicle 10 comprises a door button 32 located on an outer face of the doors 30. By pressing the door button 32 when the doors 30 are in the closed state, the doors 30 become opened. Further, by pressing the door button 32 when the doors 30 are in the open state, the doors 30 become closed.

As shown in FIG. 1, on the front face, rear face, and side face of the vehicle and inside the vehicle cabin, respective displays 21F, 21R, 21S, and 211 are located. The display 21F on the vehicle front face is located below the front windshield. The display 21R on the vehicle rear face is located below the rear windshield (not shown in drawing). The display 21S on the vehicle side face is located on the outer face above the sliding doors 30. The display 211 inside the vehicle cabin is located on the inner wall near the ceiling on the right side of the vehicle.

The displays 21F, 21R, 21S provided on the outer face of the vehicle are LED displays, and the display 211 provided inside the vehicle cabin is a liquid crystal display. Here, an LED display is a display which is constituted by arranging a large number of LED elements in a matrix, and on which letters, symbols, and the like are depicted by selectively turning on a plurality of the LED elements. The structures of the displays 21F, 21R, 21S, 211 are not limited to those mentioned above. As each of the displays, it is possible to selectively employ an LED display, a liquid crystal display, an organic EL display, or the like.

The displays 21F, 21R, 21S provided on the outer face of the vehicle serve to display the route number, route name, destination, main stopping stations (i.e., bus stops), and the like of the route travelled by the vehicle 10. Further, the display 211 provided inside the vehicle cabin serves to display information such as all stopping stations (i.e., bus stops).

Figure 2:
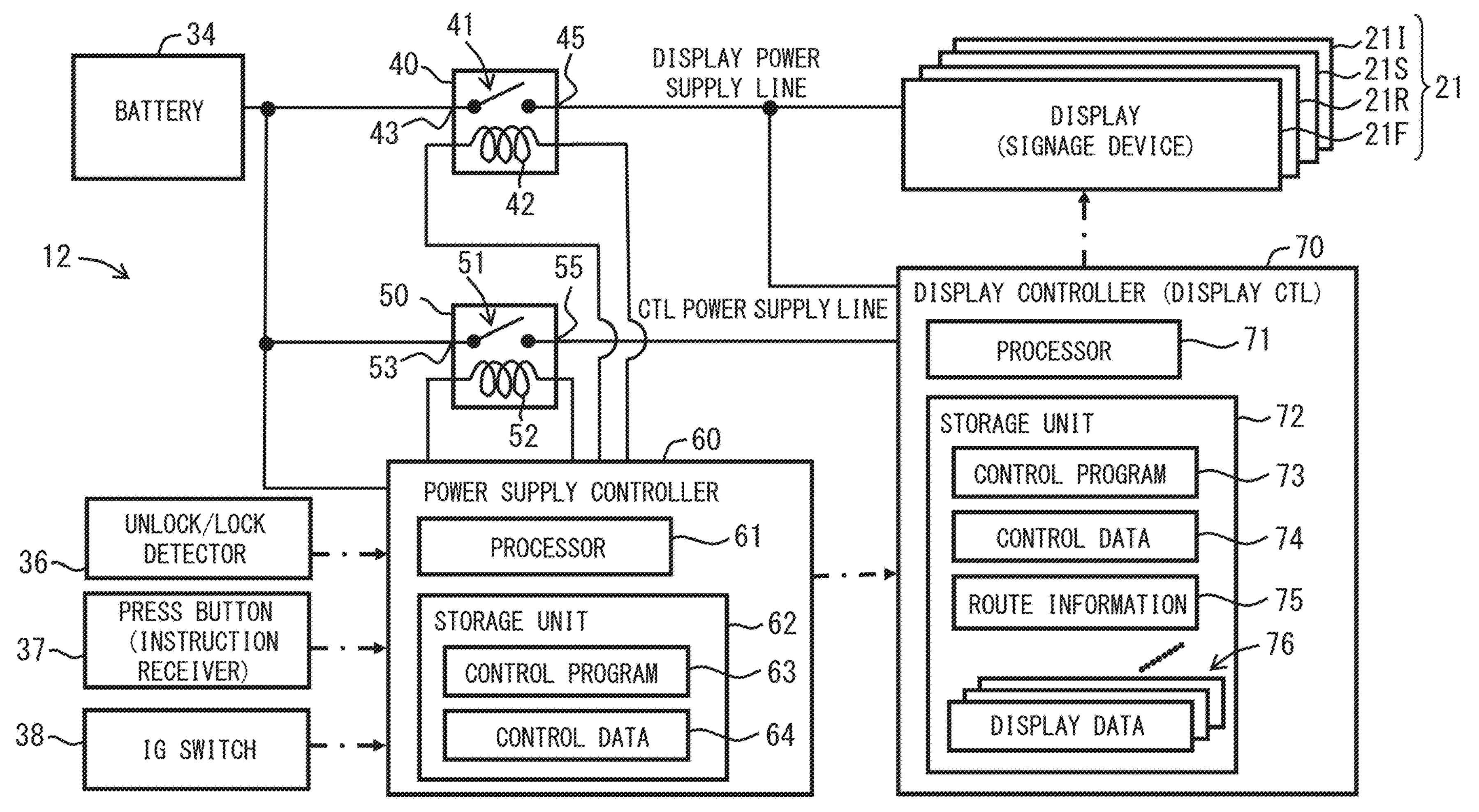
FIG. 2 is a functional block diagram of a display system for vehicle according to the embodiment.

FIG. 2 is a functional block diagram of a display system 12 for vehicle (i.e., vehicle-mounted display system 12) according to an embodiment. The display system 12 comprises the displays 21F, 21R, 21S, 211, a display controller 70, a display power supply relay 40, a controller (CTL) power supply relay 50, a power supply controller 60, an unlock/lock detector 36, a press button (i.e., instruction receiver) 37, an IG switch (ignition switch) 38, and a battery 34. In the following description, when it is unnecessary to distinguish between the respective displays 21F, 21R, 21S, 211, those are referred to as "the displays 21." Further, where appropriate, "controller" is denoted as "CTL." In the following description, "CTL power supply" denotes a controller power supply, and "CTL power supply relay" denotes the controller power supply relay. Further, "display CTL" denotes the display controller.

The display controller 70 is a device that supplies display data 76 to the displays 21. The display controller 70 comprises a processor 71 including a CPU, and a storage unit 72. The storage unit 72 is, for example, a RAM, a ROM, a flash memory, or the like. The storage unit 72 stores therein a control program 73, control data 74, route information 75, and a plurality of sets of display data 76. The route information 75 is information concerning the route on which the vehicle 10 is operated, and includes, for example, the route number, route name, destination, and stopping stations (i.e., bus stops). The processor 71 operates according to the control program 73 and the control data 74 stored in the storage unit 72. The processor 71 generates the plurality of sets of display data 76 using the route information 75, and supplies the generated display data to the displays 21.

The display power supply relay 40 is a mechanical relay. The display power supply relay 40 comprises a coil 42 and a switch 41 actuated by the coil 42. Both terminals of the coil 42 are connected to the power supply controller 60. An input terminal 43 of the switch 41 is connected to the battery 34, and an output terminal 45 of the switch 41 is connected to the displays 21 and the display controller 70. The output terminal 45 of the switch 41 functions as a display power supply 45 and feeds power to the displays 21. Although the display power supply 45 is connected to the display controller 70, the display power supply 45 does not feed power to the display controller 70. The display controller 70 monitors turning on and off of the display power supply 45 and performs its own control.

The CTL power supply relay 50 is a mechanical relay. The CTL power supply relay 50 comprises a coil 52 and a switch 51 actuated by the coil 52. Both terminals of the coil 52 are connected to the power supply controller 60. The input terminal 53 of the switch 51 is connected to the battery 34, and the output terminal 55 of the switch 51 is connected to the display controller 70. The output terminal 55 of the switch 51 functions as a CTL power supply 55 and feeds power to the display controller 70.

The power supply controller 60 is a device that controls the display power supply relay 40 (i.e., the switch 41) and the CTL power supply relay 50 (i.e., the switch 51). The power supply controller 60 controls the ON and OFF states of the switch 41 by controlling a current caused to flow through the coil 42 of the display power supply relay 40, and controls the ON and OFF states of the switch 51 by controlling a current caused to flow through the coil 52 of the CTL power supply relay 50. The power supply controller 60 comprises a processor 61 including a CPU, and a storage unit 62. The storage unit 62 is, for example, a RAM, a ROM, a flash memory, or the like. The storage unit 62 stores therein a control program 63 and control data 64. The processor 61 operates according to the control program 63 and the control data 64 stored in the storage unit 62.

The unlock/lock detector 36 (hereinafter may simply be referred to as "the detector 36") is a device that detects unlocking and locking of the doors 30 effected by a key of the vehicle 10. For example, the doors 30 are unlocked or locked by causing a key carried by a crew member of the vehicle 10 to be inserted and turned in a keyhole (not shown in drawing) provided in the vehicle 10. Alternatively, the doors 30 are unlocked or locked when a key radio wave receiver (not shown in drawing) mounted on the vehicle 10 receives a radio wave from a smart key carried by a crew member. Specifically, when a radio wave that is output from the smart key when an unlock button or a lock button provided on the smart key is pressed is received by the key radio wave receiver, the doors 30 are thereby unlocked or locked. Alternatively, the doors 30 are unlocked when a manipulation for opening the doors 30 (i.e., pressing of the door button 32) is performed while the key radio wave receiver is receiving a radio wave from the smart key. Further, the doors 30 are locked when, after a manipulation for closing the doors 30 (i.e., pressing of the door button 32) is performed while the key radio wave receiver is receiving a radio wave from the smart key, a certain period of time has elapsed after the key radio wave receiver stops receiving the radio wave from the smart key. As such, there are various configurations in which the doors 30 are unlocked and locked with a key of the vehicle 10. The detector 36 may be, for example, a sensor that detects mechanical operations of a lock part of the doors 30, or may be the key radio wave receiver mounted on the vehicle 10. Further, the detector 36 may be, for example, a detection system formed including the key radio wave receiver and the door button 32. No particular limitation is imposed on the configuration of the detector 36 so long as the detector 36 can detect unlocking and locking of the doors 30 effected by a key. The detector 36 is electrically connected to the power supply controller 60.

The press button 37 is an instruction receiver that receives instructions for turning on and off the display power supply relay 40 (i.e., the switch 41). The press button 37 is provided near the driver's seat inside the vehicle, and is to be operated by a crew member of the vehicle 10. The press button 37 may be a power button of a navigation system of the vehicle 10. In other words, it may be configured such that of the display power supply relay 40 (i.e., the switch 41) is switched between the ON and OFF states in accordance with pressing of the power button of the navigation system (i.e., the display power supply 45 is turned on when the power of the navigation system is turned on, and the display power supply 45 is turned off when the power of the navigation system is turned off). The press button 37 is electrically connected to the power supply controller 60.

The ignition switch 38 (hereinafter denoted as "IG switch 38") of the vehicle 10 is electrically connected to the power supply controller 60. Information regarding turning on and off of the IG switch 38 is input into the power supply controller 60.

The battery 34 is mounted on the vehicle 10, and is electrically connected to the input terminal 43 of the display power supply relay 40, the input terminal 53 of the CTL power supply relay 50, and the power supply controller 60. The battery 34 supplies electric power to the display system 12.

Figure 3:
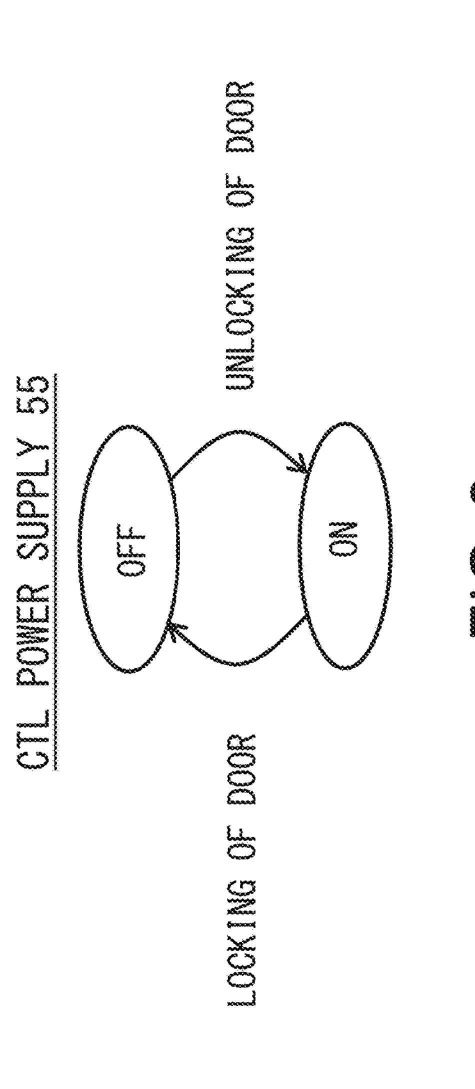
FIG. 3 is a state transition diagram of a controller power supply.

FIG. 3 is a state transition diagram of the CTL power supply 55 (i.e., the CTL power supply relay 50). When the unlock/lock detector 36 detects unlocking of the doors 30 while the CTL power supply 55 is in the OFF state (with the switch 51 open), the power supply controller 60 places the CTL power supply 55 in the ON state (with the switch 51 closed). Further, when the unlock/lock detector 36 detects locking of the doors 30 while the CTL power supply 55 is in the ON state (with the switch 51 closed), the power supply controller 60 places the CTL power supply 55 in the OFF state (with the switch 51 open).

Figure 4:
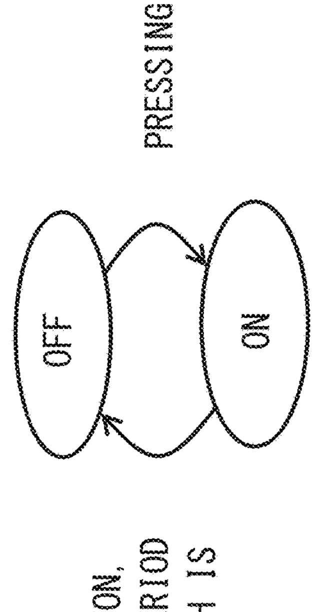
FIG. 4 is a state transition diagram of a display power supply.

FIG. 4 is a state transition diagram of the display power supply 45 (i.e., the display power supply relay 40). Upon detecting pressing of the press button 37 while the display power supply 45 is in the OFF state (with the switch 41 open), the power supply controller 60 places the display power supply 45 in the ON state (with the switch 41 closed). Further, upon detecting pressing of the press button 37 while the display power supply 45 is in the ON state (with the switch 41 closed), the power supply controller 60 places the display power supply 45 in the OFF state (with the switch 41 open). In addition, when, after detecting switching of the IG switch 38 from the ON state to the OFF state while the display power supply 45 is in the ON state, a predetermined period of time has elapsed from the detection, the power supply controller 60 places the display power supply 45 in the OFF state. This control of the display power supply 45 according to the IG switch 38 is for the purpose of preventing battery depletion caused in cases where a crew member forgets to turn off the display power supply 45.

Figure 5:
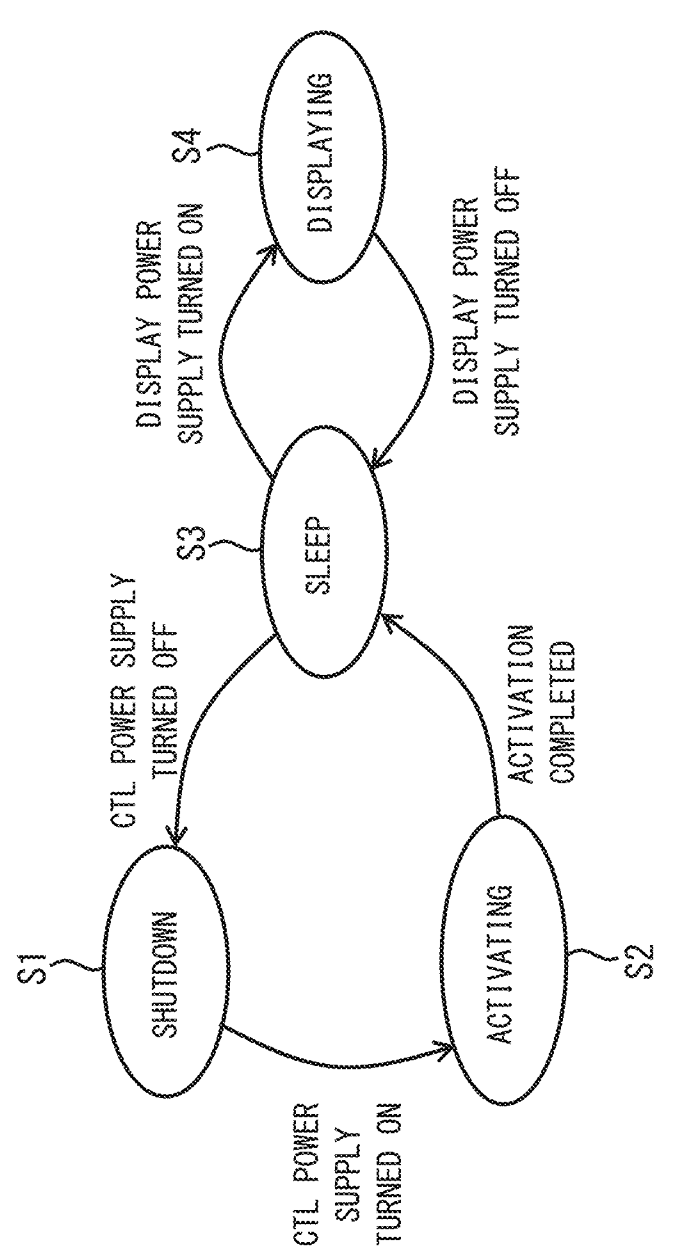
FIG. 5 is a state transition diagram of a display controller.

FIG. 5 is a state transition diagram of the display controller 70. States of the display controller 70 include the shutdown state (S1), activating state (S2), sleep state (S3), and displaying state (S4). When the CTL power supply 55 is OFF, the display controller 70 is in the shutdown state (S1). When the CTL power supply 55 is turned on while in the shutdown state (S1), the display controller 70 transitions to the activating state (S2). In the activating state (S2), the display controller 70 reads the control program 73 and the control data 74, and carries out an activation process. The activation process includes, for example, a process of generating a plurality of sets of display data 76 (i.e., data in bitmap format) using the route information 75.

When the activation process is completed in the activating state (S2), the display controller 70 transitions to the sleep state (S3). In the sleep state (S3), the display controller 70 stops driving of a part or all of clock signals in the processor 71, so that power consumption by the display controller 70 is suppressed.

While in the sleep state (S3), when the display power supply 45 is turned on by pressing of the press button 37 by a vehicle crew member, the display controller 70 transitions to the displaying state (S4). In the displaying state (S4), the display controller 70 restarts driving of the clock signals that were stopped in the sleep state (S3), and supplies the plurality of sets of display data 76 in the storage unit 72 to the respective displays 21. The displays 21 receive the display data 76, and display images according to the display data 76.

While in the displaying state (S4), when the display power supply 45 is turned off, the display controller 70 again transitions to the sleep state (S3). The display controller 70 is to transition between the sleep state (S3) and the displaying state (S4) in accordance with turning on and off of the display power supply 45. While in the sleep state (S3), when the CTL power supply 55 is turned off, the display controller 70 returns to the shutdown state (S1).

Figure 6A:
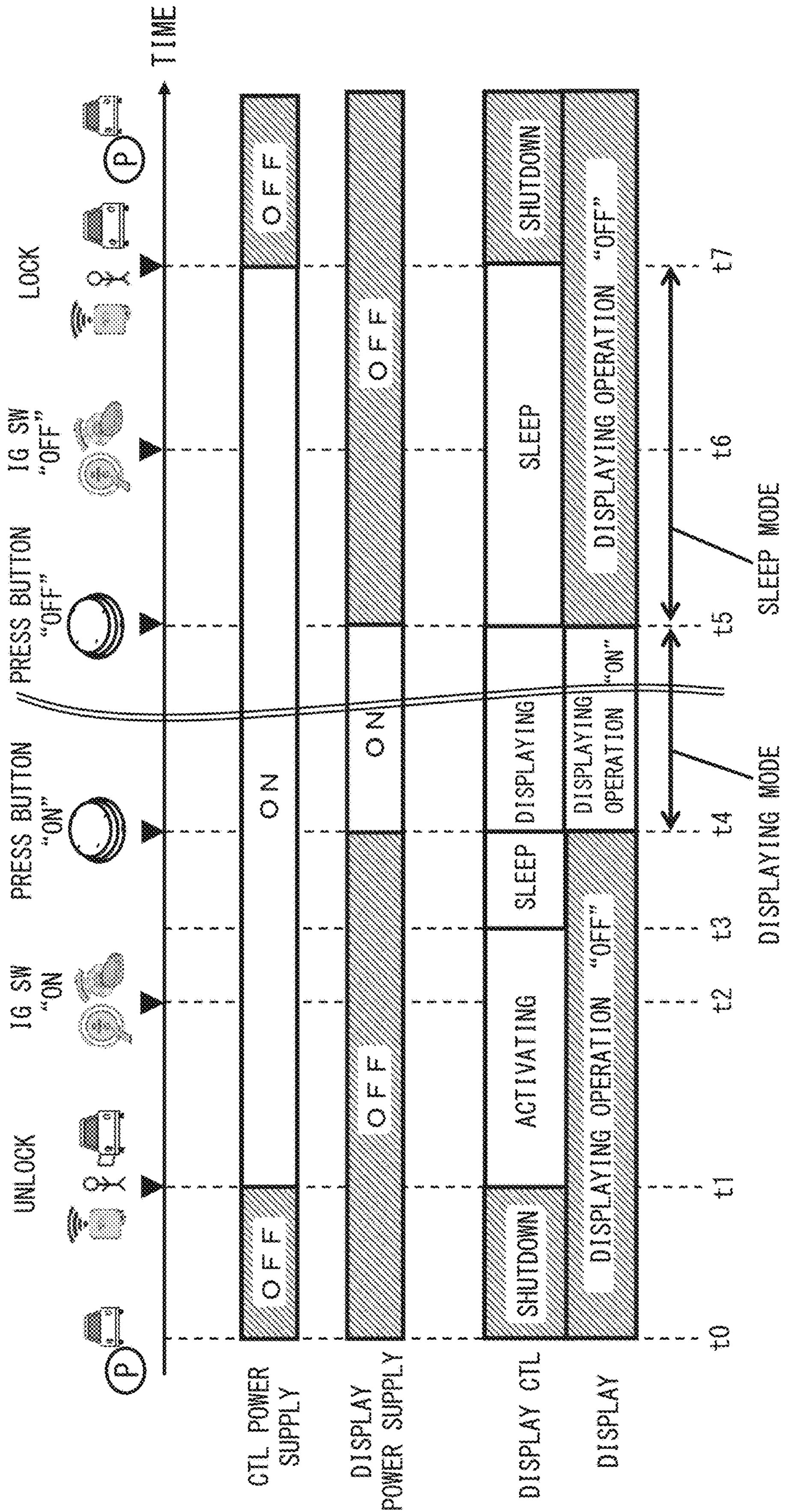
FIG. 6A is a timing chart showing an example of state changes of the display controller and displays.

FIG. 6A is a timing chart showing an example of state changes of the display controller 70 and the displays 21. As shown in FIG. 6A, at time t0, the vehicle 10 is parking in a parking lot or the like. At that time, both of the CTL power supply 55 and the display power supply 45 are in the OFF state, the display controller 70 is in the shutdown state, and displaying operation of the displays 21 is turned off.

At time t1, a crew member of the vehicle 10 unlocks the lock of the doors 30 of the vehicle 10 using a key, and boards the vehicle 10. At that time, the unlock/lock detector 36 detects the unlocking, and the power supply controller 60 switches the CTL power supply 55 (i.e., the CTL power supply relay 50) from the OFF state to the ON state. As a result, the display controller 70 transitions from the shutdown state to the activating state, and the activation process is carried out in the display controller 70.

At time t2, the IG switch is turned on. Subsequently, at time t3, the activation process in the display controller 70 is completed, and the display controller 70 transitions to the sleep state.

At time t4, the crew member presses the press button 37. The power supply controller 60 detects the pressing of the press button 37, and causes the display power supply 45 (i.e., the display power supply relay 40) to transition from the OFF state to the ON state. As a result, the display system 12 is placed in the displaying mode in which feeding of power to both of the display controller 70 and the displays 21 is carried out. The display controller 70 is placed in the displaying state, and the displays 21 display images.

In this example, since the CTL power supply 55 (i.e., the CTL power supply relay 50) is turned on and the activation process of the display controller 70 is started at the point of time at which the unlocking of the doors 30 of the vehicle 10 is detected (i.e., at the point of time at which the boarding of the vehicle 10 by the crew member is detected; at t1 in FIG. 6A), images can be promptly displayed on the displays 21 when the press button 37 is pressed by the crew member (i.e., when the display power supply 45 is turned on).

During the period from t4 to t5, the vehicle 10 operation is carried out. Subsequently, at time t5, the crew member presses the press button 37. The power supply controller 60 detects the pressing of the press button 37, and causes the display power supply 45 (i.e., the display power supply relay 40) to transition from the ON state to the OFF state. As a result, the display system 12 is placed in the sleep mode in which feeding of power to the displays 21 is shut off while feeding of power to the display controller 70 is maintained. The display controller 70 is placed in the sleep state, and displaying operation of the displays 21 is turned off.

Since feeding of power to the display controller 70 is maintained in the sleep mode of the display system 12, when the crew member again presses the press button 37 (i.e., turns on the display power supply 45) in that mode, images can be promptly displayed on the displays 21. When the display power supply 45 is turned on in the sleep mode, the display system 12 again transitions to the displaying mode. The display system 12 is to transition between the sleep mode and the displaying mode in accordance with turning on and off of the display power supply 45.

At time t6, the IG switch 38 is turned off. Subsequently, at time t7, the crew member alights from the vehicle 10, and locks the lock of the doors 3 using the key of the vehicle 10. At that time, the unlock/lock detector 36 detects the locking, and the power supply controller 60 switches the CTL power supply 55 from the ON state to the OFF state. As a result, the display controller 70 transitions from the sleep state to the shutdown state.

Figure 6B:
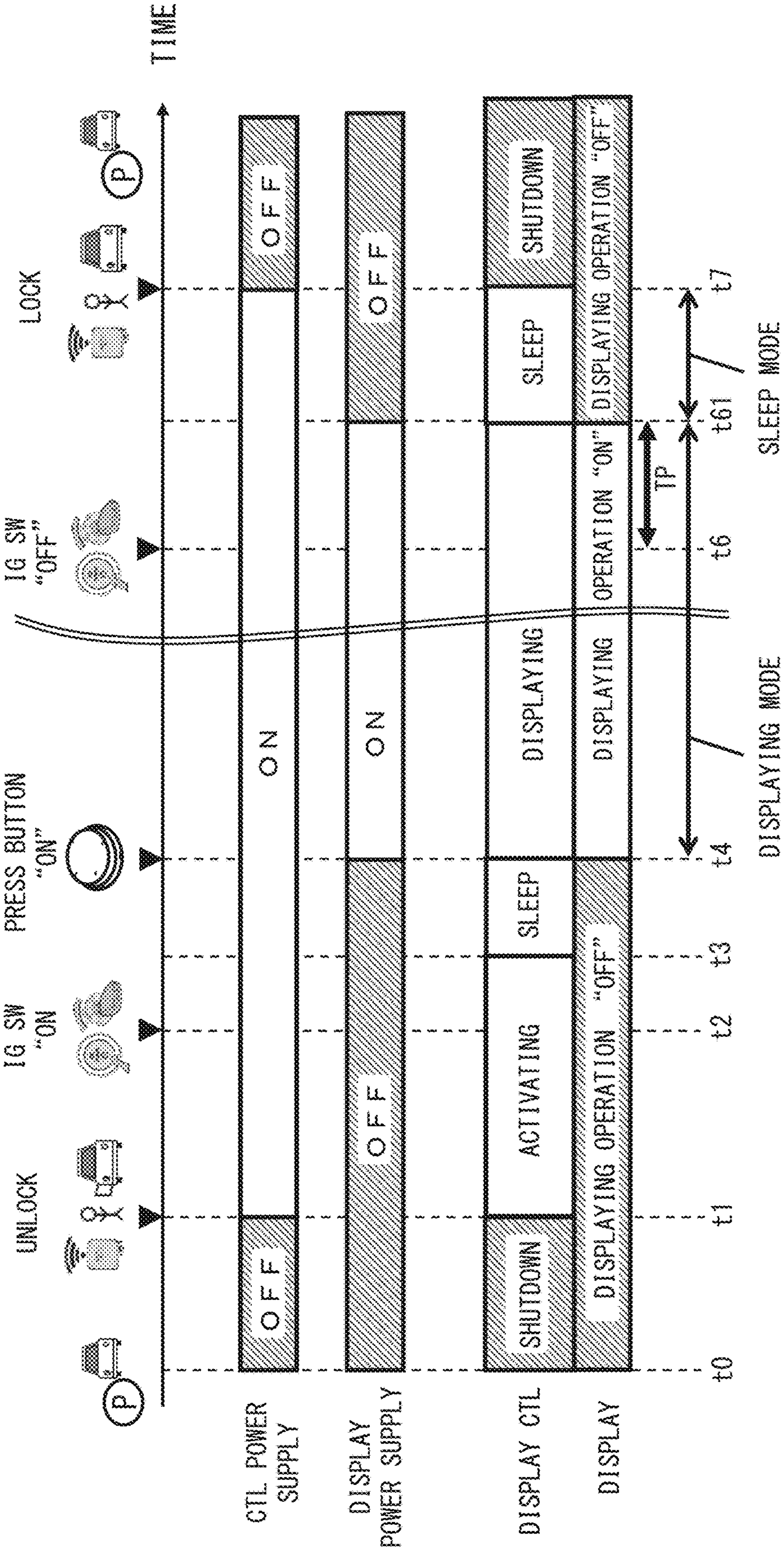
FIG. 6B is a timing chart showing another example of state changes of the display controller and the displays.

FIG. 6B is a timing chart showing another example of state changes of the display controller 70 and the displays 21. In FIG. 6B, operations from t0 to t4 are the same as those in FIG. 6A, and operations after t4 are different from those in FIG. 6A. FIG. 6B illustrates an example in which the crew member inadvertently forgets to turn off the display power supply 45 using the press button 37.

As shown in FIG. 6B, at time t4, the crew member presses the press button 37, and the display power supply 45 transitions from the OFF state to the ON state. As a result, the display system 12 is placed in the displaying mode, the display controller 70 is placed in the displaying state, and the displays 21 display images.

Subsequently, after the vehicle 10 operation is carried out, the crew member forgets to turn off the display power supply 45, and at time t6, the IG switch 38 is turned off. The power supply controller 60 detects the switching of the IG switch 38 from the ON state to the OFF state, and measures, with a timer, an elapsed period of time from the point at which the switching was detected (i.e., t6 in FIG. 6B). When the elapsed period of time reaches a predetermined period of time TP (at t61 in FIG. 6B), the power supply controller 60 switches the display power supply 45 (i.e., the display power supply relay 40) from the ON state to the OFF state. As a result, the display system 12 is placed in the sleep mode, the display controller 70 is placed in the sleep state, and displaying operation of the displays 21 is turned off. The above-noted predetermined period of time TP is stored in advance in the storage unit 62 of the power supply controller 60.

As such, since the power supply controller 60 automatically turns off the display power supply 45, battery depletion can be prevented even when the crew member inadvertently forgets to turn off the display power supply 45. Operations of the display system from time t61 onward in FIG. 6B are the same as those from time t6 onward in FIG. 6A.

Figure 7:
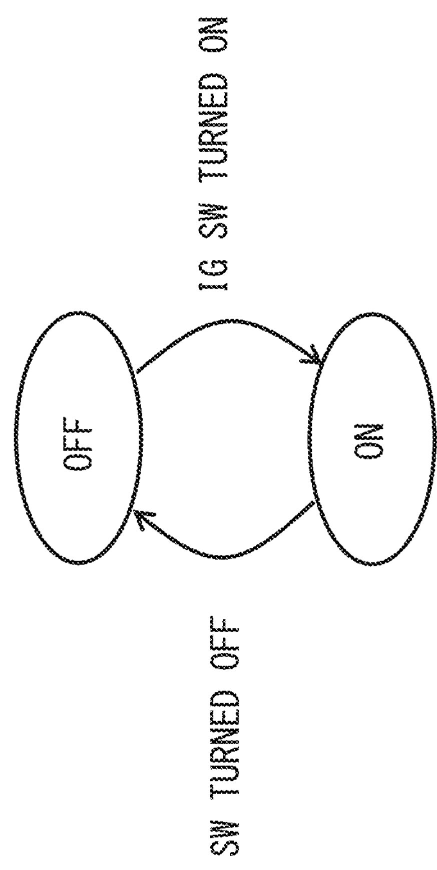
FIG. 7 is a state transition diagram of a display power supply in a display system for vehicle according to a further embodiment.
Figure 8:
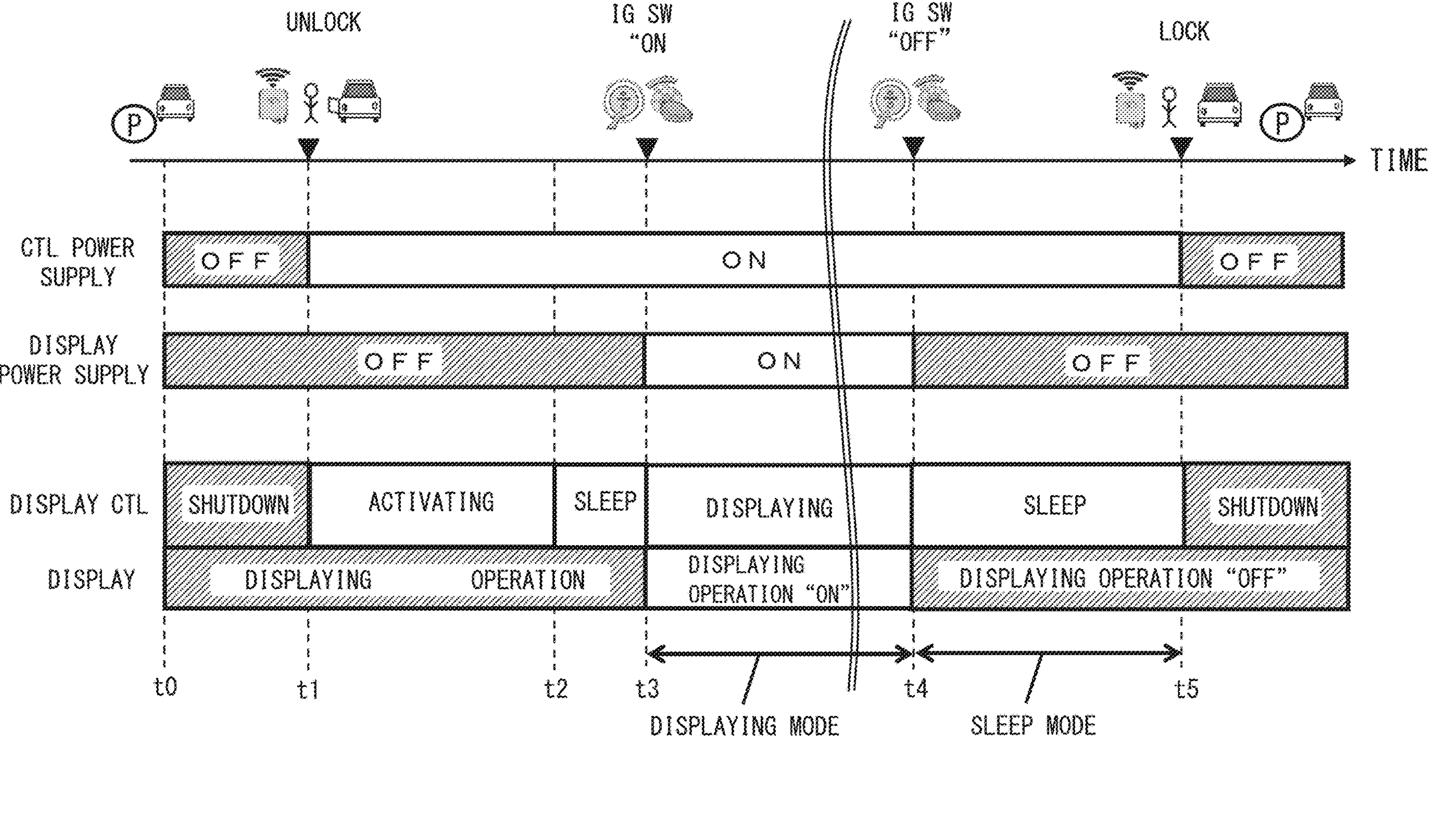
FIG. 8 is a timing chart showing an example of state changes of a display controller and displays in the display system for vehicle according to the further embodiment.

Next, a display system for vehicle according to a further embodiment will be described. FIG. 7 is a state transition diagram of the display power supply 45 in the further embodiment, and FIG. 8 is a timing chart showing an example of state changes of the display controller 70 and the displays 21 in the further embodiment. This further embodiment and the above-described embodiment are different from each other in the control of the display power supply 45 by the power supply controller 60, and are identical in configuration in other points. The further embodiment employs the IG switch 38 as the instruction receiver that receives instructions for turning on and off the display power supply 45 (i.e., the display power supply relay 40).

As shown in FIG. 7, upon detecting a change in the IG switch 38 from the OFF state to the ON state while the display power supply 45 is in the OFF state (with the switch 41 open), the power supply controller 60 places the display power supply 45 in the ON state (with the switch 41 closed). Further, upon detecting a change in the IG switch 38 from the ON state to the OFF state while the display power supply 45 is in the ON state (with the switch 41 closed), the power supply controller 60 places the display power supply 45 in the OFF state (with the switch 41 open).

In FIG. 8, operations from t0 to t1 are the same as those in FIG. 6A, and operations after t1 are different from those in FIG. 6A. As shown in FIG. 8, at time t1, the unlock/lock detector 36 detects unlocking of the doors 30, and the power supply controller 60 switches the CTL power supply 55 (i.e., the CTL power supply relay 50) from the OFF state to the ON state. As a result, the display controller 70 transitions from the shutdown state to the activating state, and the activation process is carried out in the display controller 70.

At time t2, the activation process is completed in the display controller 70, and the display controller 70 transitions to the sleep state.

At time t3, a crew member switches the IG switch 38 from the OFF state to the ON state. The power supply controller 60 detects the switching on of the IG switch 38, and causes the display power supply 45 (i.e., the display power supply relay 40) to transition from the OFF state to the ON state. As a result, the display system 12 is placed in the displaying mode in which feeding of power to both of the display controller 70 and the displays 21 is carried out. The display controller 70 is placed in the displaying state, and the displays 21 display images.

During the period from t3 to t4, the vehicle 10 operation is carried out. Subsequently, at time t4, the crew member switches the IG switch 38 from the ON state to the OFF state. The power supply controller 60 detects the switching off of the IG switch 38, and causes the display power supply 45 (i.e., the display power supply relay 40) to transition from the ON state to the OFF state. As a result, the display system 12 is placed in the sleep mode in which feeding of power to the displays is shut off while feeding of power to the display controller 70 is maintained. The display controller 70 is placed in the sleep state, and displaying operation of the displays 21 is turned off. Operations of the display system from time t4 onward in FIG. 8 are the same as those from time t6 onward in FIG. 6A.

According to the further embodiment described above, since the display power supply 45 is switched between the ON and OFF states in accordance with turning on and off of the IG switch 38, work load of the crew member in manipulating the display system can be reduced as compared to in the embodiment in which, in addition to manipulation of the IG switch 38, the press button 37 is used to switch the display power supply 45 between the ON and OFF states.

In the above-described embodiments, the displays 21 receive power input from only the display power supply 45. However, it is also possible to employ a configuration in which, in addition to receiving power from the display power supply 45, the displays 21 receive power input from the controller power supply 55, and feeding of power is carried out from the controller power supply 55 to a part of each display 21 (for example, a part such as a memory for temporarily storing the display data 76 in each display 21).

The invention claimed is:

1. A display system for vehicle, comprising:

a display located on an outer face or inside a vehicle cabin of a vehicle;

a display controller configured to generate display data using route information concerning a route on which the vehicle operates and supply the display data to the display;

a display power supply relay configured to switch on and off feeding of electric power to the display;

a controller power supply relay configured to switch on and off feeding of electric power to the display controller;

an instruction receiver configured to receive instructions for turning on and off the display power supply relay;

a power supply controller configured to control the display power supply relay and the controller power supply relay; and an unlock detector configured to detect unlocking of a door effected by a key of the vehicle, wherein the power supply controller switches the controller power supply relay from an OFF state to an ON state when unlocking of the door is detected by the unlock detector, thereby feeding of power to the display controller is started and a process of generating the display data is started by the display controller, the power supply controller switches the display power supply relay from an OFF state to an ON state at a point of time of receiving an ON instruction from the instruction receiver after switching the controller power supply relay from the OFF state to the ON state, thereby placing the display system in a displaying mode in which feeding of power to both of the display controller and the display is carried out and a generated display data is supplied to the display, and in the displaying mode, upon receiving an OFF instruction from the instruction receiver, the power supply controller switches the display power supply relay from the ON state to the OFF state while maintaining the controller power supply relay in the ON state, and thereby places the display system in a sleep mode in which feeding of power to the display is shut off while feeding of power to the display controller is maintained.

2. The display system for vehicle according to claim 1, wherein when, after detecting switching of an ignition switch of the vehicle from an ON state to an OFF state while in the displaying mode, a predetermined period of time has elapsed from the detection, the power supply controller switches the display power supply relay from the ON state to the OFF state, and thereby places the display system in the sleep mode.

3. The display system for vehicle according to claim 2, wherein upon receiving an ON instruction from the instruction receiver while in the sleep mode, the power supply controller switches the display power supply relay from the OFF state to the ON state, and thereby places the display system back in the displaying mode.

4. The display system for vehicle according to claim 3, further comprising a lock detector configured to detect locking of a door effected by a key of the vehicle, and the power supply controller switches the controller power supply relay from the ON state to the OFF state when locking of the door is detected by the lock detector.

5. The display system for vehicle according to claim 2, further comprising a lock detector configured to detect locking of a door effected by a key of the vehicle, and the power supply controller switches the controller power supply relay from the ON state to the OFF state when locking of the door is detected by the lock detector.

6. The display system for vehicle according to claim 1, wherein upon receiving an ON instruction from the instruction receiver while in the sleep mode, the power supply controller switches the display power supply relay from the OFF state to the ON state, and thereby places the display system back in the displaying mode.

7. The display system for vehicle according to claim 6, further comprising a lock detector configured to detect locking of a door effected by a key of the vehicle, and the power supply controller switches the controller power supply relay from the ON state to the OFF state when locking of the door is detected by the lock detector.

8. The display system for vehicle according to claim 1, further comprising a lock detector configured to detect locking of a door effected by a key of the vehicle, and the power supply controller switches the controller power supply relay from the ON state to the OFF state when locking of the door is detected by the lock detector.

9. The display system for vehicle according to claim 1, wherein the instruction receiver is a press button located inside the vehicle cabin of the vehicle, upon detecting pressing of the press button while the display power supply relay is in the OFF state, the power supply controller accepts this pressing as an instruction to turn on the display power supply relay, and upon detecting pressing of the press button while the display power supply relay is in the ON state, the power supply controller accepts this pressing as an instruction to turn off the display power supply relay.

10. The display system for vehicle according to claim 1, wherein the instruction receiver is an ignition switch of the vehicle, upon detecting a change in the ignition switch from an OFF state to an ON state, the power supply controller accepts this change as an instruction to turn on the display power supply relay, and upon detecting a change in the ignition switch from the ON state to the OFF state, the power supply controller accepts this change as an instruction to turn off the display power supply relay.

* * * * *